March 23, 1948.   E. L. MILLER   2,438,323
TRACTOR FIFTH WHEEL MOUNTING
Filed May 10, 1946

INVENTOR
ELMER L. MILLER
BY
ATTORNEYS

Patented Mar. 23, 1948

2,438,323

UNITED STATES PATENT OFFICE 2,438,323

TRACTOR FIFTH WHEEL MOUNTING

Elmer L. Miller, Dayton, Ohio, assignor to The Dayton Steel Foundry Company, Dayton, Ohio, a corporation of Ohio Application May 10, 1946, Serial No. 668,896

4 Claims. (Cl. 280—33.05)

1

The present invention relates to mountings for fifth wheels such as commonly used on the tractor of tractor-semi-trailer constructions. These devices are well known in the trade and consist of a large flat bearing platform or plate which is pivotally mounted on brackets attached to the rear of the tractor. The plate is provided with a rearwardly opening flaring slot designed to receive the king pin on the forward end of the trailer and with suitable jaws by which the king-pin is locked in position when the two vehicles are in coupled relation. The fifth wheel is usually unbalanced so that it rocks downwardly when the vehicles are uncoupled until the rear end thereof rests upon the floor of the tractor, thereby holding the fifth wheel in a tilted position to pass under the forward end of the trailer when the tractor is backed into coupling relation.

Although attempts have been made to improve the mountings for the tractor fifth wheel, the standard method is to mount the fifth wheel directly upon transverse pins secured in the brackets on the body of the tractor. These standard bearings should be lubricated frequently and, as the bearing is a metal-to-metal contact, it is rigid so that the shocks and vibrations from one vehicle are transmitted to the other. The fifth wheel will sometimes remain in horizontal position in spite of its unbalanced condition and does not tilt downwardly when the vehicles are uncoupled. If the driver fails to note and correct this condition accidents may occur when the vehicles are being coupled.

It is one object of the invention to devise a satisfactory mounting for the fifth wheel that will dispense with the necessity of any lubrication at the bearings and will serve as a cushioning medium between the tractor and the trailer and thus absorb much of the relative movement between the vehicles when in operation. It is a further object of the invention to so mount the fifth wheel on the tractor that the resilient bearing is placed under torsional strain when the fifth wheel is horizontal, as when the vehicles are coupled, so that when the vehicles are uncoupled the torsional effect will insure that the fifth wheel tips downwardly into its proper idle position.

The drawings show a standard or typical fifth wheel mounted in accordance with the principles of the invention, it being understood that the showing is of the preferred or best known embodiment of the invention and is not to be taken as limiting it to the details shown and described herein.

2

Figure 1:
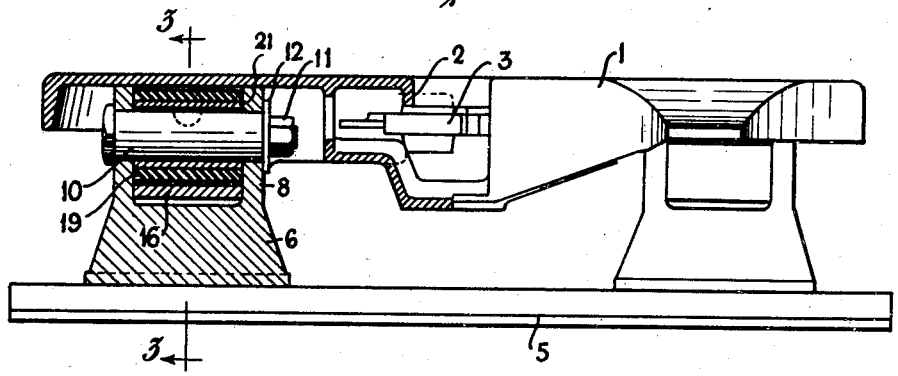
Fig. 1 is a view looking from the rear at the fifth wheel in horizontal position, one side being taken on the vertical section indicated by the line 1—1 of Fig. 2.
Figure 2:
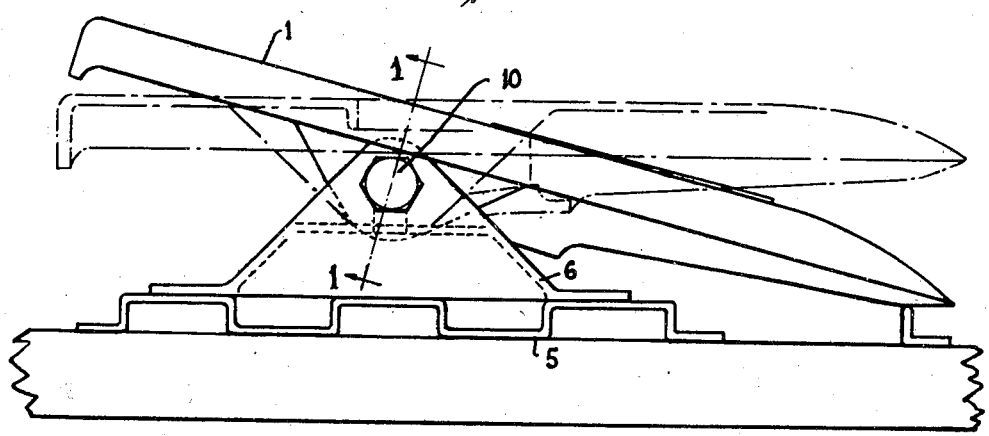
Fig. 2 is a side elevation, the normal idle position being shown in full lines and the operative position which the fifth wheel assumes in service being shown in dotted lines.
Figure 3:
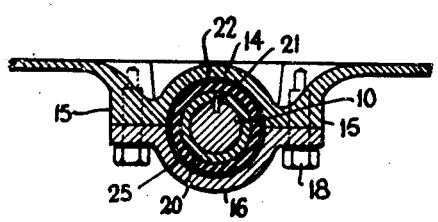
Fig. 3 is a section on the line 3—3 of Fig. 1.

As fifth wheels of various types are standardized, the details thereof will not be described, it being sufficient to say that the main body of the fifth wheel is a platform 1 provided with a V-shaped slot 2 for the reception of the king pin on the trailer and with locking means indicated at the numeral 3 for engaging the king pin to couple the two vehicles together.

The deck of the tractor is shown as a plate 5 and on this plate are the two aligned brackets 6 which are formed with the vertical lugs 8. Through the lugs of each bracket is passed a stout bearing pin 10 which constitutes a support for the fifth wheel. Each pin is non-rotatively mounted with respect to its bracket by force fitting, or by some other non-rotative connection. A nut 11 on the reduced end of the bolt and a lock washer 12 secures the bearing pin in position.

Somewhat forwardly of the transverse center of gravity of the platform 1, the body of the platform is provided with a semi-circular formation 14 on either side of which is located the shoulder 15. A semi-circular cap plate 16 is attached to the surfaces 15 by bolts 18 and these two elements at each bearing point constitute a housing which surrounds the pin 10 but is spaced therefrom to accommodate the bearing which serves the purposes outlined above.

The bearing referred to is indicated as a whole by the numeral 19. It consists of an inner metal sleeve 20 which is slotted so that when the parts are assembled relative rotation of the pin and the inner sleeve is prevented by the key 21. Around the outside of the bearing is the outer metal sleeve 22, which is force fitted into the surfaces 14—16 so that there is no rotation of the bearing in the housing. Between the inner and outer sleeves is a bearing core 25 which is composed of a relatively hard, tough, but flexible, rubber composition comparable with a high grade tread stock. It should be capable of withstanding repeated torsional effects without losing its ability to return, when the stresses are relieved, to its normal, unstressed position. The rubber should be heat resistant and of high tensile strength and capable of sustaining the load of the forward end of the trailer. As the upper surface of the platform forms the load bearing surface for the forward end of the trailer, the cushion bearings absorb many of the shocks which would otherwise be transmitted from one vehicle to the other, and therefore both vehicles ride more smoothly than they ride with the old type of mounting.

In making the bearing assembly consisting of the sleeves 20 and 22 and the core 25 the rubber and the sleeves are so joined that there is no creeping between the rubber and the metal surfaces. This may be accomplished in any manner such as known in the art. The surfaces of the metal elements may be roughened or brass plated, or both, and the core may be vulcanized in place, which serves to weld the rubber permanently to the inner and outer sleeves. In lieu of this method parts may be force fitted by inserting a rubber core with a small axial passage in the outer sleeve and then driving the inner sleeve into the passage which compresses the rubber to such an extent that it is virtually welded to the two surfaces of the members 20 and 22. Other methods may be employed for forming the bearing assembly; for the purposes of this invention the rubber core and the inner and outer sleeves are united so that any relative rotation of either sleeve with respect to the other will, within the limits to which said movements take place in the fifth wheel assembly, be absorbed by the rubber.

When the fifth wheel is assembled upon the tractor body the fifth wheel is tilted downwardly either at the angle which it assumes when the vehicles are uncoupled or a slightly steeper angle. As the bearing sleeves have no relative movement on the pin 10 or in the housing 14—16, when the vehicles are coupled and the platform 1 is moved by the trailer to horizontal position, the torsional stresses which are set up in the rubber core urge the platform to its proper inclined position when the vehicles are uncoupled. The result is that the platform 1 is unfailingly moved to its proper inclined position.

During the operation of the tractor-trailer combination the rubber core greatly improves the action of the entire assembly because, except in extreme cases, the vibrations and movements of each element of the combination are largely absorbed by the bearing and not transmitted to the other elements of the combination. All necessity for lubricating these parts of the tractor is eliminated.

While a natural rubber is preferred as the basic ingredient of the core 25, any acceptable substitute may be employed in place thereof and when the term "rubber" is used in the claims it will be understood that such equivalents are comprehended thereby.

What is claimed is:

1. In a fifth wheel for tractors the combination of a support, a load bearing platform on the support, a pivotal mounting for the platform containing a resilient bushing immovably connected to the support and the platform, said bushing being so mounted that there is tension in the bushing when in horizontal position, said tension being relaxed when the platform is tilted downwardly.

2. In a fifth wheel for tractors the combination of a support on the tractor, a bearing pin on the support, a platform, a housing on the platform, means to arrest the platform in a tilted position, and a resilient bushing between the pin and the housing, said bushing being under torsional stress whereby it tends to move the platform to the inclined position.

3. In a fifth wheel for tractors, the combination of a support on the tractor, a bearing pin on the support, a platform, a housing on the platform, means to arrest the platform in a tilted position, and a rubber bushing between the pin and the housing, said bushing being so mounted that it is torsionally deformed when the platform is in horizontal position and tends to move the platform to its tilted position.

4. In a fifth wheel for tractors, the combination of a bracket on the tractor, a pin immovably mounted in the bracket, a pivoted platform, a housing on the platform surrounding but spaced from the pin, and a rubber bushing assembly between the pin and the housing, said bushing comprising inner and outer shells fixed to the pin and housing, respectively, and a rubber core between the shells and immovably united therewith, said bushing assembly being so constructed and arranged that the rubber of the core is under torsional stresses when the platform is in horizontal position.

ELMER L. MILLER.

REFERENCES CITED

The following references are of record in the file of this patent:

UNITED STATES PATENTS

| Number | Name | Date |
| --- | --- | --- |
| 2,263,114 | Winn | Nov. 18, 1941 |
| 2,353,267 | Reid | July 11, 1944 |
| 2,359,499 | Walther | Oct. 3, 1944 |